United States Patent
Richardson

(10) Patent No.: US 7,113,576 B2
(45) Date of Patent: *Sep. 26, 2006

(54) METHOD FOR CORRECTING CALL DETAIL RECORD FILES

(75) Inventor: John H. Richardson, Cedar Park, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/919,927

(22) Filed: Aug. 17, 2004

(65) Prior Publication Data

US 2005/0018824 A1    Jan. 27, 2005

Related U.S. Application Data

(63) Continuation of application No. 09/955,319, filed on Sep. 18, 2001, now Pat. No. 6,798,871.

(51) Int. Cl.
*H04M 15/00* (2006.01)

(52) U.S. Cl. .............................. 379/114.04; 379/121.05; 379/112.01; 379/114.01; 379/114.03; 379/126

(58) Field of Classification Search ........... 379/114.01, 379/114.03, 114.04, 114.28, 116, 119, 121.05, 379/126, 133, 112.01, 112.06, 112.09; 455/405, 455/406

See application file for complete search history.

(56) References Cited

U.S. PATENT DOCUMENTS

| | | | |
|---|---|---|---|
| 5,325,290 A | 6/1994 | Cauffman et al. | |
| 5,680,611 A | 10/1997 | Rail et al. | |
| 5,802,142 A * | 9/1998 | Browne | 379/28 |
| 5,987,633 A | 11/1999 | Newman et al. | |
| 6,016,340 A | 1/2000 | Bayraktar | |
| 6,052,448 A | 4/2000 | Janning | |
| 6,249,571 B1 * | 6/2001 | Rojas | 379/112.01 |
| 6,252,951 B1 * | 6/2001 | Alcott et al. | 379/114.03 |
| 6,385,444 B1 * | 5/2002 | Peschel et al. | 455/405 |
| 6,798,871 B1 * | 9/2004 | Richardson | 379/114.04 |
| 2005/0018824 A1 * | 1/2005 | Richardson | 379/126 |

* cited by examiner

*Primary Examiner*—Quoc Tran
(74) *Attorney, Agent, or Firm*—Toler Schaffer, LLP

(57) ABSTRACT

A method for preprocessing transaction records indicative of subscriber activity on a telecommunication network for subsequent downstream processing is provided. The method includes receiving a file including a plurality of transaction records each having a plurality of fields, wherein each field contains at least one character. The characters of selected fields, or all fields, are analyzed to determine whether each of the characters is of a desired format. When any one of the characters is of an improper format, a first flag is set to indicate the existence of an erroneous character within the selected field of the transaction record. Each of the plurality of transaction records are also analyzed to determine whether each transaction record is within a desired category of transaction records. When any one of the plurality of transaction records within a file is not within the desired category of transaction records, a second flag is set to indicate an erroneous transaction record within the file. If either flag is set, the method creates a modified version of the file and overwrites any bad data with data in a format proper for further processing by downstream transaction record processing systems such as call detail record billing systems.

19 Claims, 4 Drawing Sheets

METHOD FOR CORRECTING CALL DETAIL RECORD FILES

CROSS REFERENCE TO RELATED APPLICATION

This is Continuation of U.S. patent application Ser. No. 09/955,319 entitled "Method For Correcting Call Detail Record Files" and filed on Sep. 18, 2001 now U.S. Pat. No. 6,798,871.

TECHNICAL FIELD

The present invention relates to telecommunication networks, and in particular, to systems and methods for correcting errors within call detail record files.

BACKGROUND ART

The deregulation of the telecommunications industry has resulted in an environment where subscribers are given many choices of telecommunications service providers. Each service provider typically offers different rate plans that govern the cost the subscriber pays for various voice and data transmissions. In addition, the network over which the telecommunication services are provided, may be only partially owned or leased by the subscriber's particular service provider. To keep track of subscriber billing or network usage and communication services, service providers rely upon records created for each subscriber transaction on the network. For example, a call detail record (CDR) is generated when a telephone call is placed by a subscriber across the network. Groups of CDRs are stored in files of various formats and sizes for retrieval and processing by a computer-based billing system. To be automatically processed, however, each CDR must be properly formatted.

For example, call detail records are created when subscribers use an automated attendant system such as the InterVoice Brite Interactive Voice Response (IVR) system. The automated attendant system creates billing records which are forwarded to downstream processing systems which verify service provider billing for network time or create customer billing records for network usage. In a typical busy hour such systems can create files containing approximately 5,000 CDRs. On occasion, software errors or configuration issues can result in the creation of CDRs which contain errors and cause processing problems for the downstream billing and processing systems. In the case of automated attendant systems, the first analysis point for each file downstream of the automated attendant system is a system known as "splitter." The splitter system divides the CDRs, typically by service provider or network vendor, and further forwards each record to the appropriate subsystem. If a CDR contains any one of several conditions or errors, the entire file is rejected by the splitter system. To date, the only method for processing files containing records with errors is to manually search the file for the malformed record and edit the file to correct or delete the offending record. Obviously, in files containing thousands of records, this off-line error detection and correction method can be very time consuming, expensive, and labor intensive. Accordingly, there is a need for an improved and automated CDR error detection and correction system and method.

BRIEF DESCRIPTION OF THE DRAWINGS

The invention is pointed out with particularity in the appended claims. However, other features of the invention will become apparent and the invention will be best understood by referring to the detailed description in conjunction with the accompanying drawings in which:

DETAILED DESCRIPTION OF THE INVENTION

The various embodiments of the present invention yield several advantages over the prior art. In one embodiment, a method for preprocessing transaction records indicative of subscriber activity on a telecommunication network for subsequent downstream processing is provided. Each transaction record may represent a CDR. The method includes receiving a file including a plurality of transaction records each having a plurality of fields, wherein each field contains at least one character. The characters of selected fields, or all fields, are analyzed to determine whether each of the characters is of a desired format. For example, whether each character is a computer displayable character. When any one of the characters is of an improper format, a first flag (BadData) is set to indicate the existence of an erroneous character within the selected field of the transaction record. Each of the plurality of transaction records are also analyzed to determine whether each transaction record is within a desired category of transaction records. For instance, whether each record is either a header record, trailer record, or CDR. When any one of the plurality of transaction records within a file is not within the desired category of transaction records, a second flag (BadRec) is set to indicate an erroneous transaction record within the file. If either the first or second flag is set, the method creates a modified version of the file and overwrites any bad data with data in a format proper for further processing by downstream transaction record processing systems such as CDR billing systems. The modified file is then communicated to the downstream CDR processing systems. In this way, the integrity of the files forwarded to the downstream processing systems is insured.

Figure 1:
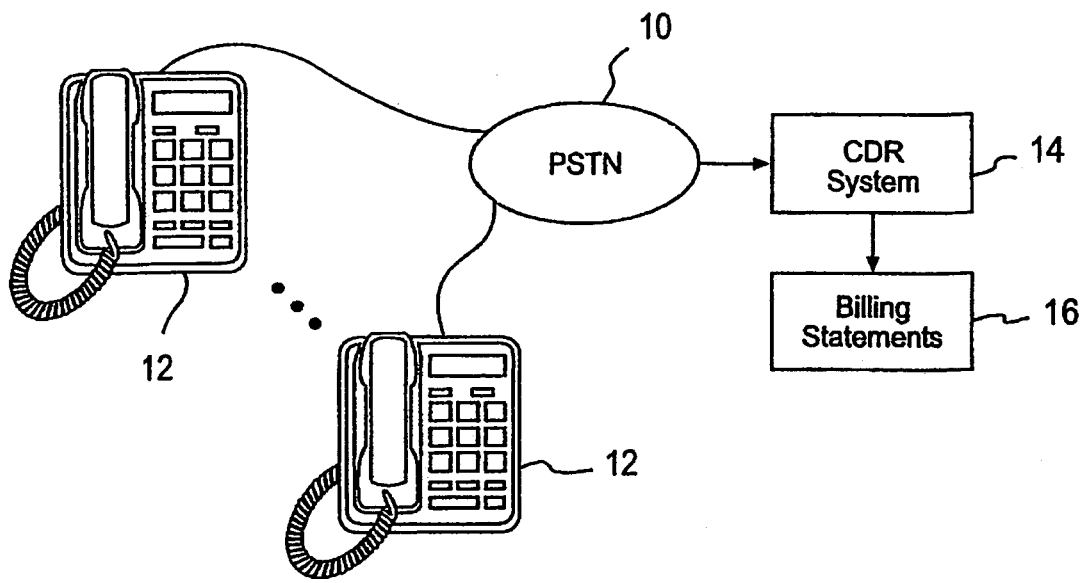
FIG. 1 is a schematic block diagram of a telecommunication system in which the present invention may be used to advantage.

FIG. 1 is a schematic block diagram of a telecommunication system in which the present invention may be used to advantage. In one embodiment, network 10 represents a public switched telephone network (PSTN) that provides telecommunication services to a plurality of network subscribers 12 having respective customer premises equipment. A CDR system 14 is coupled to the network 10 and generates transaction records including transaction data corresponding to at least one telephone call placed by at least one subscriber. The CDR system 14 generates transaction records in a manner that is known to those of skill in the art. Thus, call data is recorded, for example, at an originating central office. The CDR system 14, as described in more detail with reference to FIG. 2, processes the call detail records to ultimately provide billing statements or records 16 for at least one of a plurality of subscribers based upon network usage and the particular subscriber's calling rate plan.

Figure 2:
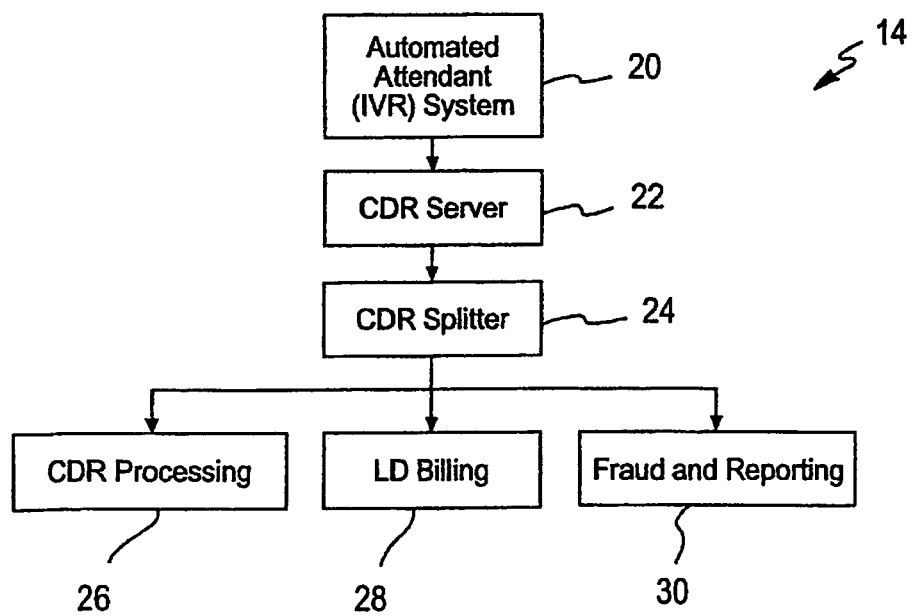
FIG. 2 is a schematic block diagram of the call detail record generating system of FIG. 1.
Figure 3A:
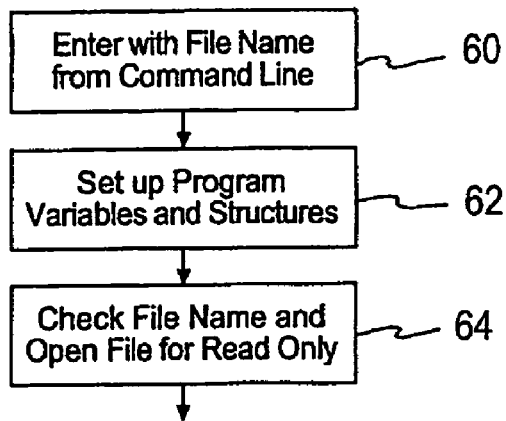
FIGS. 3A–3F are logic flow diagrams of one method of processing call detail records in accordance with the present invention.
Figure 3B:
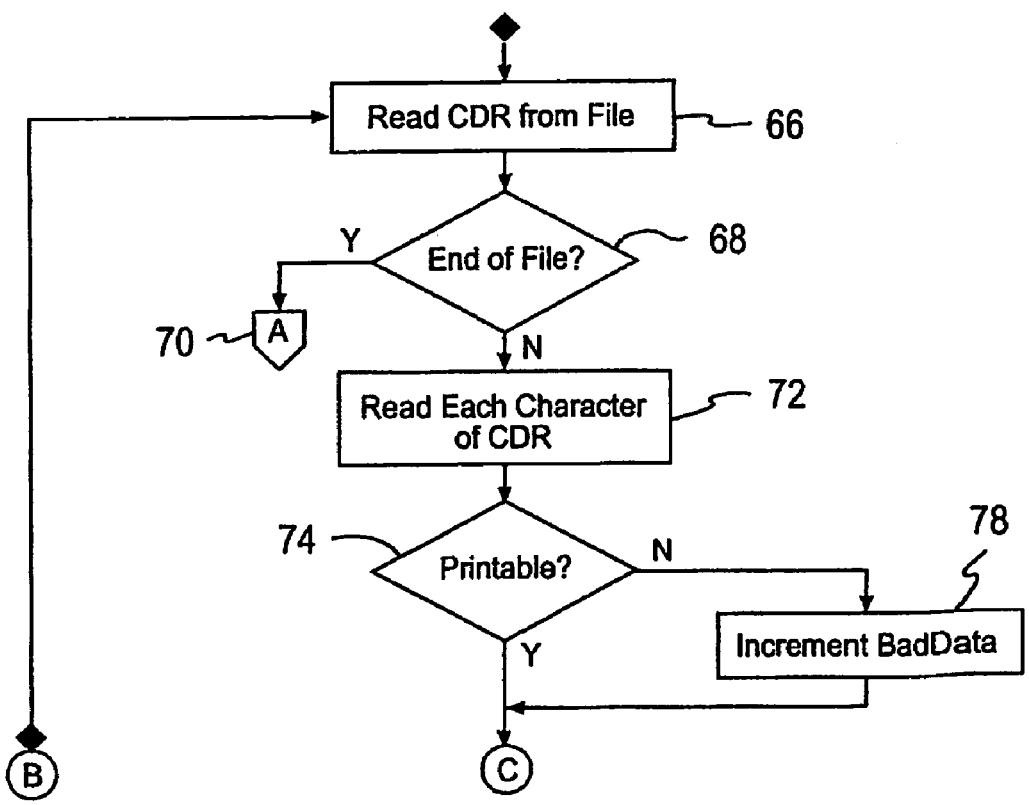
Figure 3C:
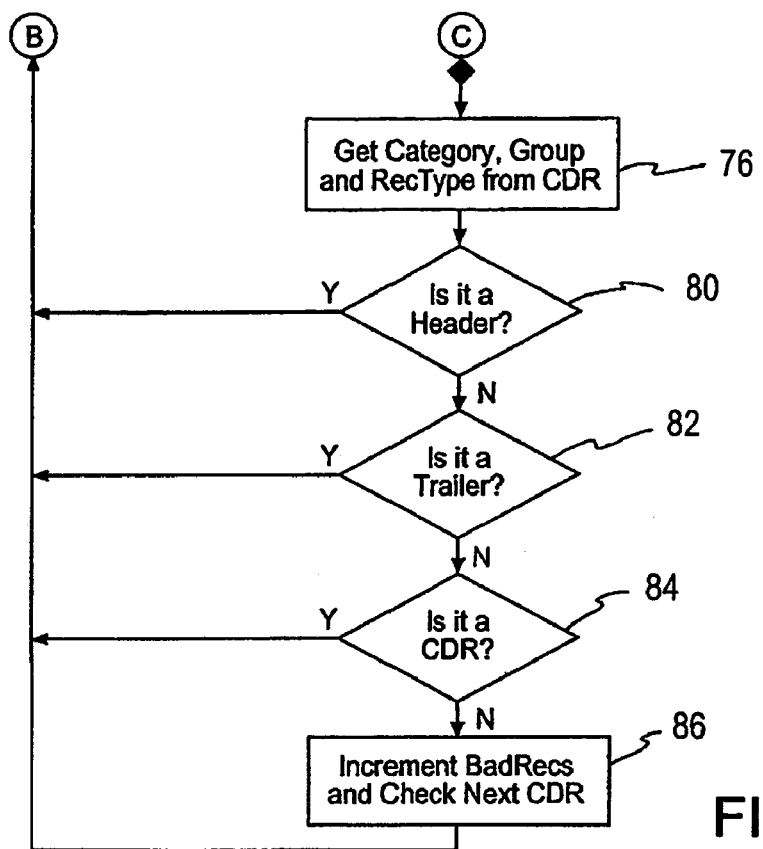
Figure 3D:
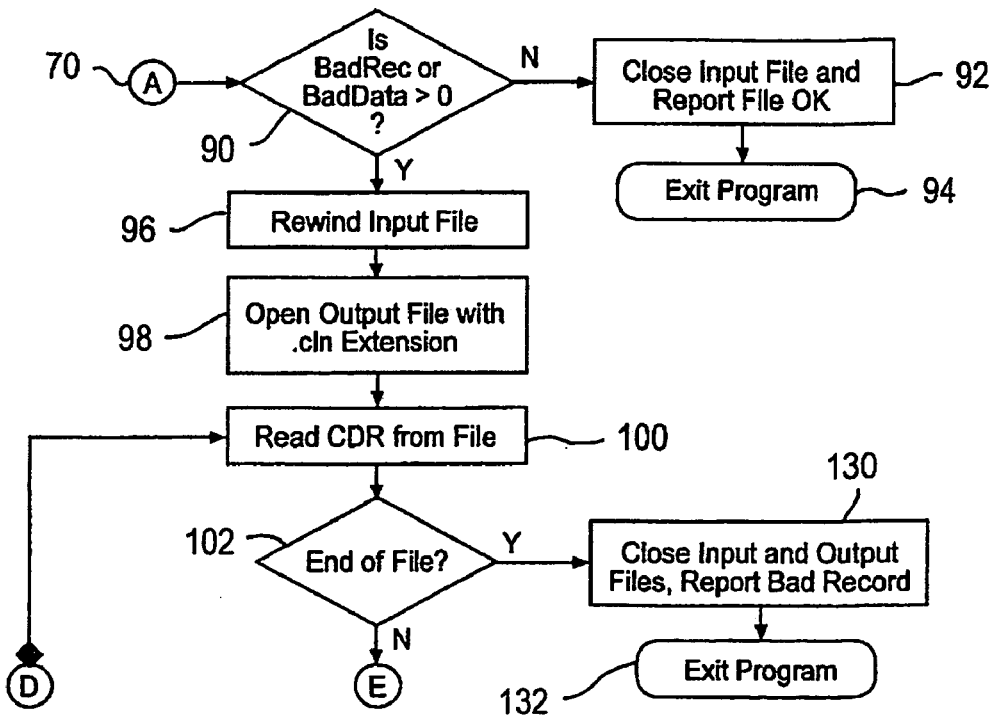
Figure 3E:
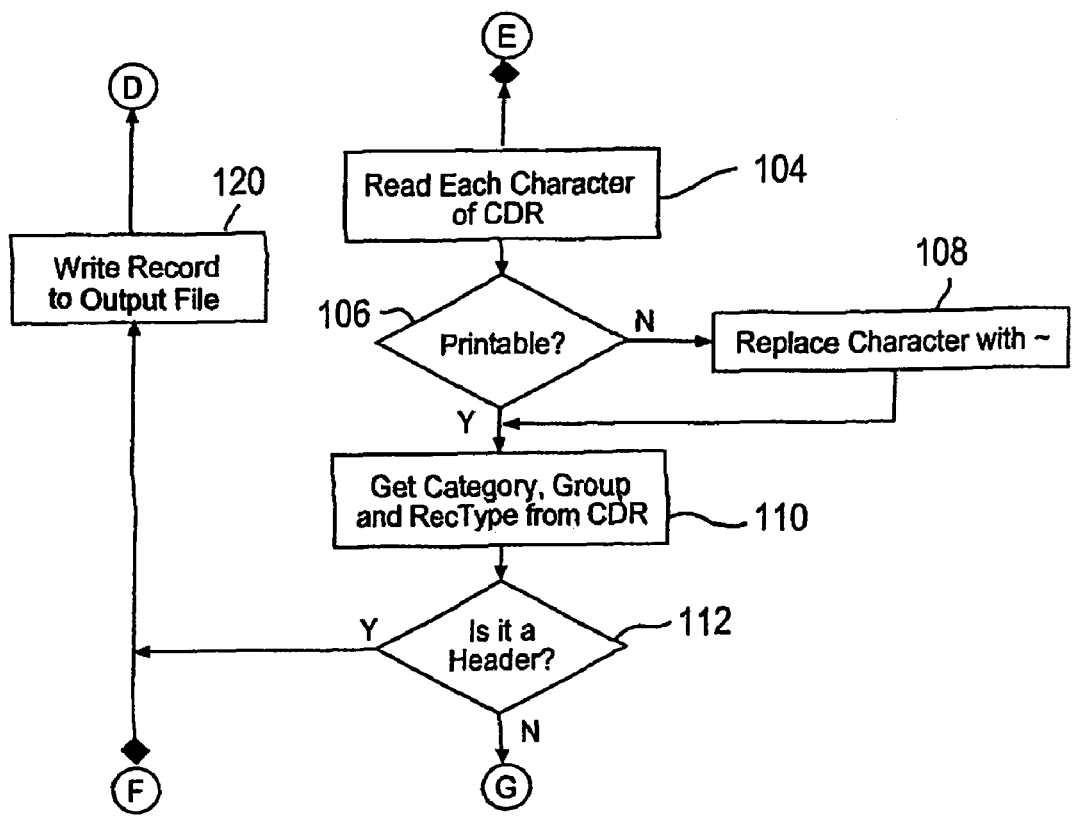
Figure 3F:
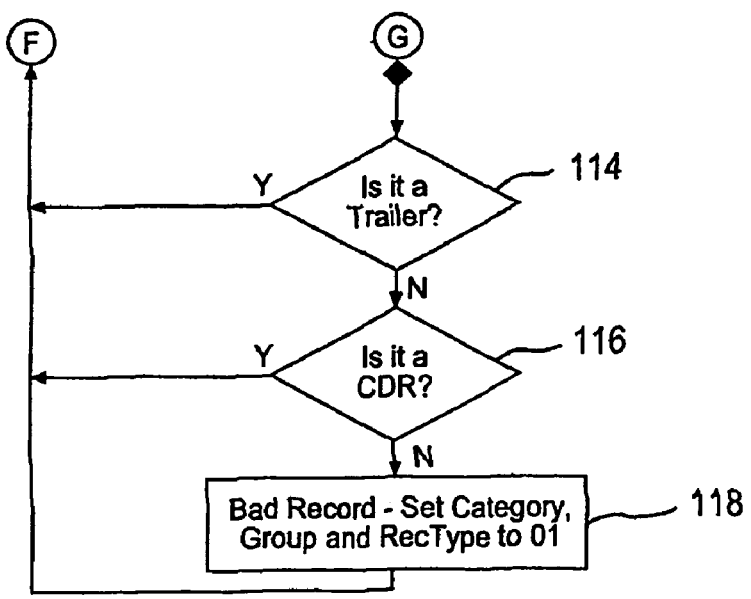

Referring now to FIG. 2 there is shown a schematic block diagram of one embodiment of the CDR system 14 of FIG. 1. In the example of FIG. 2, call detail recording and processing is shown for an automated attendant system such as the InterVoice Brite Interactive Voice Response (IVR) system 20. The IVR system 20 creates billing records that are forwarded to downstream systems which verify vendor billing for time, or create customer billing records, as described in more detail below. The IVR system 20 cooperates with a CDR server 22 to generate call detail records. CDR server 22 includes software embodying the method of the present invention for error checking and correction of the CDRs. CDR server 22 is typically implemented as a computer such as a mainframe computer running application software. The method of the present invention ensures that each CDR is in a format capable of being processed by the downstream CDR handling systems.

The first analysis point for each CDR occurs at a CDR splitter 24. The splitter 24 divides the CDRs received from the CDR server 22 and forwards each to the appropriate subsystem such as, for example, the CDR processing system 26, long distance billing system 28, or fraud and reporting system 30.

CDR processing system 26 and long distance billing system 28 are computer-implemented systems running application software to generate billing statements for network usage corresponding to at least one telephone call. Rate plans are implemented in software for generating the appropriate billing statements. For example, such rate plans can calculate total amounts as a function of: the approximate call mileage—determined from the originating NPA-NXX and terminating NPA-NXX; the jurisdiction—intrastate (interLATA or intraLATA), interstate (interLATA or intraLATA), or international; the time of day and day of week of the call, the duration of the telephone call; and the billing increment—the first minute or additional minutes; in accordance with the actual rate plan of the carrier. Optional calling plans may also be implemented in software that calculate, for instance, the toll rate based on the time of day, day of week, and the total monthly call volume in accordance with the actual optional calling plan of the carrier. Billing generators in communication with the CDR processing system 26 and/or long distance billing system 28 receive billing records for at least one of the plurality of subscribers and format and print billing statements by known methods.

Fraud and reporting system 30 is computer-implemented system running application software to detect and report potentially fraudulent network activity associated with at least one of the plurality of subscribers. The fraud and reporting system 30 is implemented by known methods based, for example, on network usage patterns associated with each of the plurality of subscribers. Uncharacteristic network activity for a particular subscriber is noted and reported for investigation as potentially fraudulent network activity.

Before the splitter can appropriately route each CDR or the CDR processing system 26, long distance billing system 28, or fraud and reporting system 30 can process a respective CDR, the CDR must be properly formatted. If a particular CDR contains any of several conditions, the entire file (potentially containing thousands of CDRs) can be rejected by the splitter 24. For this reason, the method of the present invention is implemented in software residing in the CDR server 22 to detect and correct or delete any malformed CDRs. In one embodiment, the method of the present invention is implemented as a program referred to as "CLNCDR."

Referring now to FIGS. 3A–3F there is shown a logic flow diagram of one embodiment of a method according to the present invention for detecting and correcting or deleting malformed CDRs. The CLNCDR program is activated for each file which can contain several CDRs before the file is forwarded to the CDR splitter 24. The CLNCDR program scans each file to detect any one of several conditions which may cause the CDR splitter system 24 to reject the file. If an error is detected with respect to any one of the CDRs within a file, a new file is created which contains a modified version of the offending CDR in an edited format which is acceptable to the downstream processing systems such as the CDR splitter 24.

Referring now to FIG. 3, the CLNCDR program begins at block 60 when the application running from the command line receives a file name. In the example of FIG. 3, the application is executed from the command line. Each file is received by the application as a ".dat" file. If the application is executed and no CDR errors are detected, then the program generates with an "OK" message and makes no changes to the file. If a malformed CDR is detected during program execution, the program creates a new file with the same name and a ".cln" extension and also generates a "baddata" or "error" message to note which files should be manipulated before transferring to the splitter. If a "baddata" or "error" message is generated, then the ".dat" file can be deleted or renamed and the ".cln" file used in its place. In this way, each file received by the splitter is ensured to be properly formatted for further processing. The CLNCDR application is intended to operate on most software systems such as HPUX, UNIX, WINDOWS NT, or WINDOWS 2000 using the command line interface.

In block 62, the program variables and structures are defined. For example, each CDR may be defined as a 385 character line terminated by a line-feed wherein different portions of the character string represent data associated with the call detail record. For example, characters 22 through 32 of the character string may represent the directory number inbound service number. Other portions of the character string would indicate the billing number, the billable time, the automatic number identification, the rate class, the inbound and outbound trunk numbers, the date and time, and so on.

In this regard, each transaction record, in the form of a CDR, is represented by a number of fields containing information about a telephone call. Thus, an originating number field comprises a ten-digit number identifying the calling party and a terminating number field comprising a ten-digit number identifying the called party. A connect date field indicates the date the connection was made. A connect time field indicates the time of day the connection was made and a duration field specifies the length of the call. A transaction identifier is also included to uniquely identify the CDR from all other CDRs processed by the system.

In block 64, the program checks a file of CDRs by first checking the file name and opening the file as a read-only file.

In block 66, the processing begins by selecting a first CDR in the file of CDRs. If the end of the file has been reached in block 68, the program branches to the reporting portion in block 70. Otherwise, each character of the selected CDR is read in block 72.

In block 74, if each character of the selected CDR is a printable character the program continues to block 76. Otherwise, in block 78 the variable "BadData" is incremented to maintain a count of all non-ASCII characters in all records.

In block 76, the "Category," "Group," and "Record Type" (RecType) are read from the appropriate fields in the CDR data structure. In one embodiment, the lead-in header, common to all record types, contains the Category, Group and RecType fields which are each two characters in length.

In blocks 80, 82, and 84, if the record is either a header record, trailer record, or CDR, the logic routine returns to block 66 to read the next CDR from the file. If the file is none of these types, the variable "BadRecs" is incremented in block 86 to indicate an unrecognized record within the file of records before the routine returns to block 66 to check the next CDR within the file. Once the end of the file has been reached in block 68, the logic routine continues to block 70.

In block 90, the variables "BadRecs" and "BadData" are analyzed to determine whether an unrecognized record is within the file or an unrecognizable character is within any record within the file. If neither of these variables have been incremented, the logic routine continues to block 92 where the input file is reported as being error free and the program exits in block 94.

If either "BadRecs" or "BadData" have been incremented, the input file is rewound in block 96 and a new file is created which is a duplicate of the ".dat" file with a ".cln" extension in block 98. The portion of the routine following block 98 replaces any nonprintable characters (BadData) with a printable character and/or sets the variables Category, Group and RecType to a proper expected format.

Thus, in block 100, the first CDR is read from the file. If the end of the file has not been reached in block 102, the routine continues by reading each character of the selected CDR in block 104. Blocks 106 and 108 replace each nonprintable character with a printable character such as a "tild." Of course, any character which does not interfere with the downstream CDR processing system can be used in place of the detected nonprintable characters. Alternatively, depending upon the requirements of the downstream processing systems, other field malformities may be searched other than non-printable characters. This, of course, would depend upon the record format expected by the particular downstream processing system.

Similarly, in block 110 the variables Category, Group and RecType are read from the selected CDR and if the record is not a header record, trailer record or CDR as determined in blocks 112, 114 and 116, an unrecognized record is detected and each of the variables are set to an expected value to allow processing by the downstream CDR processing systems in block 118. The corrected record is then written to the output file having the ".cln" extension in block 120, and the routine returns to block 100 to read the next CDR from the file.

Once the end of the file has been reached in block 102, the input (.dat) and output (.cln) files are closed and the existence of a bad record is reported in block 130 before the program exits in block 132.

Thus, the foregoing logic routine analyzes a file containing one or more CDRs and checks the file for nonprintable characters, improper record types and out of sequence CDRs. If any errors are found, a duplicate of the .dat files are put to a file with a cln extension. Any nonprintable characters are reset to printable characters, and any unexpected values for the variables Category, Group or Record Type are reset to expected values. The modified file can then be transmitted to downstream systems for processing of the CDR records.

By processing each CDR within a file in the foregoing manner, the system ensures that the downstream splitter receives properly formatted CDRs. Although the method has been described with respect to a particular CDR format as generated by the IVR system, the error checking and correcting method is readily applicable to similar CDR formats. As well, alternative methods for modifying corrupt data files are contemplated by the present invention.

For example, rather than analyze an entire file and creating a modified file only if errors are detected, a corresponding output file can be created for each input file analyzed at the time of analysis. In such a case, the error checking routing would merely contain steps 98 through 132 of the logic routing of FIGS. 3A–3F. The downside of eliminating the redundant check of the same file, however, is that numerous output files will be created for corresponding input files despite the input files being error free.

From the foregoing, it can be seen that there has been brought to the art a new and improved system and method for correcting call detail record files. Although the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A telecommunications system comprising:
    an automated attendant system generating a file including at least one transaction record having a data structure including a plurality of fields each containing at least one character, each transaction record indicative of subscriber activity on a public-switched telephone network;
    a transaction record preprocessor in communication with said automated attendant system, said transaction record preprocessor adapted to receive said file, analyze each character of at least one field to determine whether any of said characters is a computer unrecognizable character and, when one of said characters is computer unrecognizable, set a first flag to indicate an erroneous character within said field of said record; and
    a transaction record splitter in communication with said transaction record preprocessor, said transaction record splitter adapted to receive said file from said transaction record preprocessor and communicate said file to a downstream transaction record processing system.

2. A system according to claim 1 wherein said transaction record preprocessor is programmed to:
    create a copy of said file;
    modify each of said computer unrecognizable characters of said file copy to a desired format; and
    communicate said modified file copy to said transaction record splitter.

3. A system according to claim 1 wherein said transaction record preprocessor is programmed to:
    analyze each transaction record to determine whether each of said transaction records is within a desired category of transaction records; and
    when one of said transaction records is not within said desired category of transaction records, set a second flag to indicate an erroneous transaction record within said file.

4. A system according to claim 3 wherein said transaction record preprocessor is programmed to:
    create a copy of said file;
    modidy each transaction record not within said desired category of said file copy to be within said desired category of transaction records; and communicate said modified file copy to said transaction record splitter.

5. A system according to claim 3 wherein said transaction record is a call detail record and said file includes a plurality of said call detail records.

6. A system according to claim 5 comprising a call detail record processing system in communication with said transaction record splitter, said call detail record processing system generating customer billing statements for network usage as a function of said transaction record.

7. A system according to claim 1 wherein said transaction record preprocessor analyzes each character of at least one field to determine whether each of said characters is a computer recognizable character.

8. A system according to claim 1 wherein said transaction record preprocessor analyzes each character of each field in said file.

9. A method for pre-processing transaction records indicative of subscriber activity on a telecommunications network comprising:
generating a file including a plurality of transaction records each having a data structure including a plurality of fields each containing at least one character;
receiving said file at a transaction record preprocessor;
thereafter, analyzing each character of a plurality of said fields to determine whether each of said characters is a computer unrecognizable character and, when one of said characters is computer unrecognizable, setting a first flag to indicate an erroneous character within said field of said record;
analyzing each transaction record to determine whether each of said transaction records is within a desired category of transaction records and, when one of said transaction records is not within said desired category of transaction records, setting a second flag to indicate an erroneous transaction record within said file; and
when either said first or second flag is set, creating a copy of said file, modifying each of said computer unrecognizable characters within said file copy to a proper format or modifying each transaction record not within said desired category of said file copy to be within said desired category of transaction records, respectively, and communicating said modified file copy to a downstream transaction record processing system.

10. A method according to claim 9 further comprising, when neither of said first or second flags are set, communicating said file to a downstream transaction record processing system.

11. A method according to claim 9 wherein analyzing each character includes analyzing each character of all fields of each of said transaction records within said file.

12. A method according to claim 9 wherein said transaction record is a call detail record generated by an automated attendant system and said file includes a plurality of said call detail records.

13. A method according to claim 9 wherein analyzing each of said plurality of transaction records includes analyzing each of a category, group and record type fields within each record to determine whether said selected transaction record is a header record, trailer record or call detail record.

14. A method according to claim 9 wherein modifying each of said computer unrecognizable characters within said file copy to a proper format includes replacing said characters with a computer printable character.

15. A method for processing records indicative of subscriber activity on a telecommunications network comprising:
generating a call detail record file including at least one transaction record having a data structure including a plurality of fields each containing at least one character;
communicating said file to a call detail record server;
analyzing, at said call detail record server, each character of at least one field to determine whether each of said characters is a computer unrecognizable character and, when one of said characters is a computer unrecognizable, modifying each of said computer unrecognizable characters within said file copy to a proper format; and
thereafter, communicating said file to a downstream transaction record processing system.

16. A method according to claim 15 further comprising, when one of said characters is computer unrecognizable:
setting a first flag to indicate an erroneous character within said field of said record;
creating a copy of said file;
modifying each of said computer unrecognizable characters within said file copy to a proper format; and
thereafter, communicating said modified file copy to said downstream transaction record processing system.

17. A method according to claim 15 wherein analyzing each character includes analyzing each character of all fields of each of said transaction records within said file.

18. A method according to claim 15 further comprising:
analyzing each transaction record to determine whether each of said transaction records is within a desired category of transaction records; and
when one of said transaction records is not within said desired category of transaction records, setting a second flag to indicate an erroneous transaction record within said file.

19. A method accoring to claim 18 further comprising, when said second flag is set:
creating a copy of said file;
modifying each transaction record not within said desired category of said fiel copy to be within said desired category of transaction records;
and thereafter, communicating said modified file copy to said downstream transaction record processing system.

* * * * *